United States Patent
Li

(10) Patent No.: US 10,824,728 B2
(45) Date of Patent: Nov. 3, 2020

(54) RELIABLE DETECTION OF CO-LOCATED VIRTUAL MACHINES IN THE CLOUD USING A TRUSTED EXECUTION ENVIRONMENT

(71) Applicant: NEC Laboratories Europe GmbH, Heidelberg (DE)

(72) Inventor: Wenting Li, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 294 days.

(21) Appl. No.: 15/992,202

(22) Filed: May 30, 2018

(65) Prior Publication Data

US 2019/0370467 A1     Dec. 5, 2019

(51) Int. Cl.
| | |
|---|---|
| *G06F 21/57* | (2013.01) |
| *H04L 29/06* | (2006.01) |
| *G06F 21/44* | (2013.01) |
| *G06F 9/455* | (2018.01) |
| *G06F 21/71* | (2013.01) |

(52) U.S. Cl.
CPC .......... *G06F 21/57* (2013.01); *G06F 9/45558* (2013.01); *G06F 21/44* (2013.01); *G06F 21/71* (2013.01); *H04L 63/20* (2013.01); *G06F 2009/45562* (2013.01); *G06F 2009/45587* (2013.01)

(58) Field of Classification Search
CPC ...... G06F 21/57; G06F 21/44; G06F 9/45558; G06F 21/71; G06F 2009/45587; G06F 2009/45562; H04L 63/20
See application file for complete search history.

(56) References Cited

U.S. PATENT DOCUMENTS

| | | | | |
|---|---|---|---|---|
| 8,881,143 | B2 * | 11/2014 | Prabhakaran | G06F 9/455 718/1 |
| 9,009,836 | B1 * | 4/2015 | Yarykin | G06F 9/45558 726/24 |
| 2014/0208111 | A1 * | 7/2014 | Brandwine | G06F 9/45558 713/171 |
| 2019/0370467 | A1 * | 12/2019 | Li | G06F 21/57 |

OTHER PUBLICATIONS

Matthias Flittner, et al., „Cloud Inspector: A Transparency-as-a-Service Solution for Legal Issues in Cloud Computing, 2016 IEEE International Conference on Cloud Engineering Workshop, Dec. 2016, pp. 1-6.

Joe Cropper, „Overview of Collocation Rules, IBM PowerVC, Jun. 8, 2015, pp. 1-3.

* cited by examiner

*Primary Examiner* — Matthew Smithers
*Assistant Examiner* — Mirza Israr Javed
(74) *Attorney, Agent, or Firm* — Leydig, Voit & Mayer, Ltd.

(57) ABSTRACT

A method for detecting co-located virtual machines (VMs) includes receiving one or more VM deployment requests from a user device. One or more VMs are deployed in a cloud infrastructure based on the VM deployment requests. The cloud infrastructure includes one or more host machines each having a trusted execution environment (TEE). Evidence is collected for each of the one or more VMs using a trusted application running in the respective TEE of the respective host machine. The collected evidence is inspected to determine whether at least two VMs in the one or more VMs share a same host machine in the one or more host machines. At least one VM is requested to be redeployed to meet a policy based on results of inspecting the collected evidence.

20 Claims, 4 Drawing Sheets

RELIABLE DETECTION OF CO-LOCATED VIRTUAL MACHINES IN THE CLOUD USING A TRUSTED EXECUTION ENVIRONMENT

FIELD

The present invention relates to methods and systems for detecting co-located virtual machines using a trusted execution environment (TEE).

BACKGROUND

Cloud computing is one of the most prominent trends in the information technology (IT) sector, promising benefits for institutions in various industrial sectors. Nevertheless, several companies and institutions are reluctant to move their information technology (IT) resources and services into the cloud. For example, providers of cloud-supported internet of things (IoT) or critical infrastructures like those in energy or traffic sectors have strong concerns. These providers and critical infrastructures can benefit from cloud features like increased redundancy, scalability, pay as you use, resilience, elasticity, and cost reduction. However, reluctance of these service providers is comprehensible since the use of cloud computing is based on trust in the cloud providers' reasonable conduct in handling their data and virtual resources.

SUMMARY

In an embodiment, the present invention provides a method for detecting co-located virtual machines (VMs). The method includes receiving one or more VM deployment requests from a user device. One or more VMs are deployed in a cloud infrastructure based on the VM deployment requests. The cloud infrastructure includes one or more host machines each having a trusted execution environment (TEE). Evidence is collected for each of the one or more VMs using a trusted application running in the respective TEE of the respective host machine. The collected evidence is inspected to determine whether at least two VMs in the one or more VMs share a same host machine in the one or more host machines. At least one VM is requested to be redeployed to meet a policy based on results of inspecting the collected evidence.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
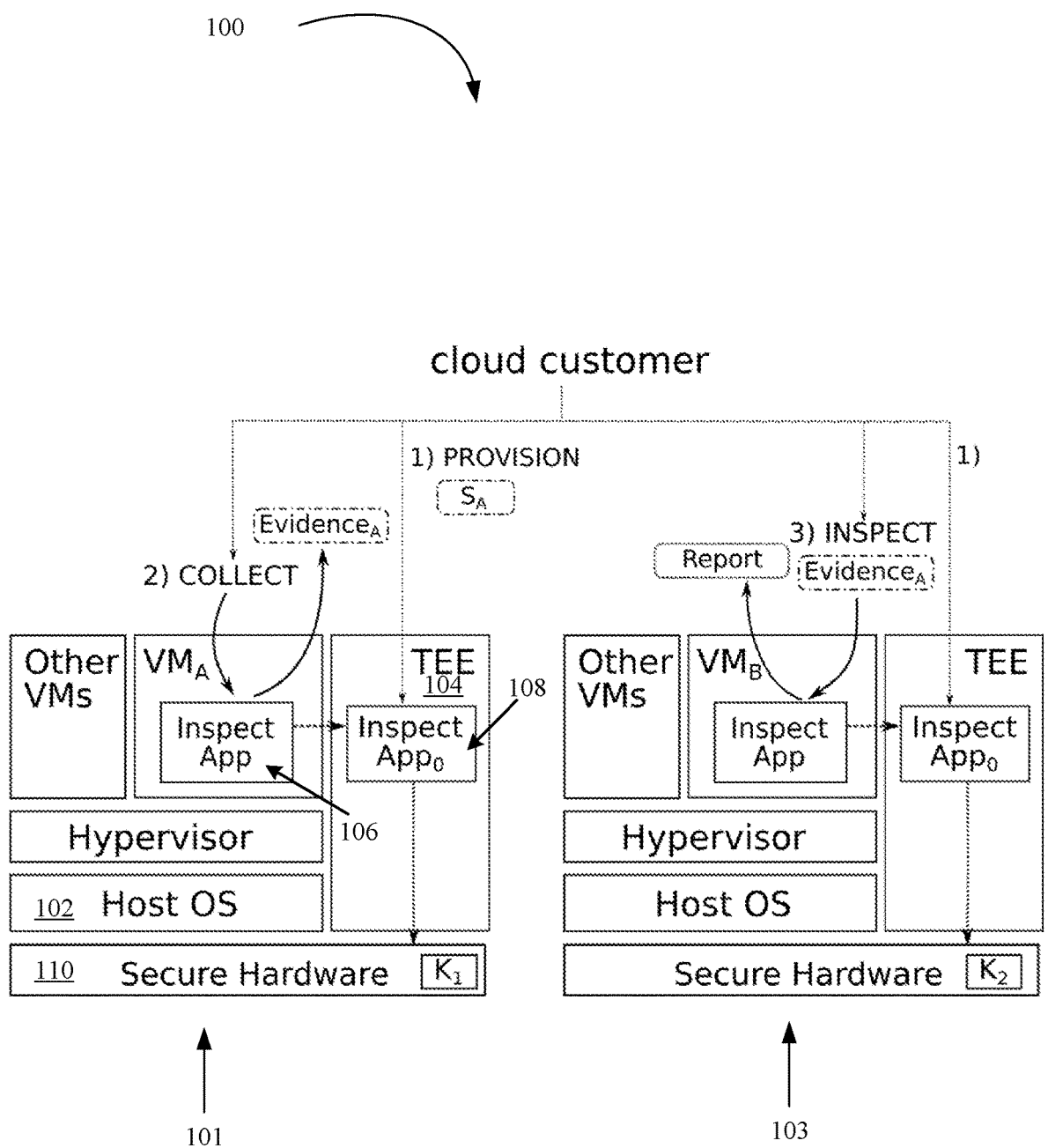
FIG. 1 illustrates a system architecture 100 of a cloud infrastructure as a service (IaaS) infrastructure according to an embodiment of the invention.

With increasing demands from industrial businesses to migrate their systems to the cloud, more and more cloud providers are featuring customizable services with easily configured deployment policies. For example, in IaaS, cloud customers can configure memory, central processing unit (CPU), instance storage, the boot partition size and firewall rules according to their needs. In some cases, a full control of the deployed system is possible, allowing cloud customers to decide in which geographical region the physical machines that hosting their services should be located.

Although existing cloud services cover a wide range of demands from industrial customers, there are gaps not covered.

In particular, the inventor has recognized that existing cloud services do not cover certain gaps in regards to configuring security policies and providing corresponding guarantees. One such security policy is allocating virtual machines (VMs) on different physical machines (i.e., anti-affinity policy) or on the same host (i.e., affinity policy). On one hand, anti-affinity policy is important for a company's risk management. Customers usually desire a backup system to guarantee availability of their services in case the main systems crash. If both the main system and the backup system are deployed on the same physical machine in the cloud, then once the physical machine is corrupted, the customer's service will not be available from either the main or backup systems. On the other hand, affinity policy is desirable for performance optimization. Certain components of a system may exhibit better performance when co-located with each other on the same physical machine. The better performance sometimes attributed to a reduction in cost of intercommunication among these components. Therefore, using embodiments of the invention, customers can be provided a guarantee from cloud providers regarding whichever policy—affinity or anti-affinity—the customers desire. This ensures that the proper functioning of the cloud computing network, proper policy verification and enforcement and enhanced security of the cloud computing network. Moreover, policies can be selected verified and enforced so as to increase network performance, for example, by affinity policy, and/or to guarantee service availability in the event of a crash, for example, by anti-affinity policy.

Only some cloud services, such as PowerVC, allow customers to configure colocation rules. However, these cloud services include the condition that customers fully trust the VM hypervisor from the cloud provider, since as it currently stands, customers are unable to verify whether or not the policy is enforced. Inability to verify the policy introduces difficulties in risk management for a customer, since a failure of one physical machine could bring down multiple services in the customer's hosted VMs. Many critical industrial companies or government facilities shy away from cloud services for the lack of guarantees on such risk management policies.

Furthermore, customers cannot opt to optimize their services by hosting them on the same physical machine. Existing software services and tools for inspecting VM operations collect all VM operations, such as VM placement, snapshot creation, and so on, for auditing purposes. An example of a software service or tool for inspecting VM operation is described by Flittner et al., "CloudInspector: A Transparency-as-a-Service Solution for Legal Issues in Cloud Computing," IEEE (2016), which is incorporated herein by reference in its entirety. However, pieces of evidence gathered by these tools are either provided by the hosting operating system or are obtained using an application programming interface (API) from the VM hypervisor, both of which are under the full control of the cloud provider. As such these pieces of evidence are not sufficiently trusted to be used as court evidence in case of mal-configuration or misconfiguration.

Embodiments of the present invention leverage existing functionalities provided by the TEE, such as sealing/unsealing and local attestation, to obtain verifiable evidence about whether two deployed VMs co-locate on the same physical machine. As such, a cloud customer is able to verify deployment configuration of its VMs, determining whether the deployment configuration aligns with their affinity or anti-affinity policy. Using embodiments of the present invention, the verification result is reliable even when the VM hypervisor or the host operating system is not honest, thereby enhancing system security, as well as increasing trust and the likelihood that VMs will always be deployed in alignment with their policy.

Embodiments of the present invention provide a mechanism for a cloud customer to verify whether any of deployed VMs of the cloud customer co-locate on the same physical machine in the cloud. Existing functionalities provided by the TEE are leveraged to obtain verifiable results even when the VM hypervisor or the host operating system is malicious. As such, embodiments of the present invention allow trusted verification of affinity or anti-affinity policies without the need for a cloud customer to trust information provided by the cloud provider.

Embodiments of the present invention provide a mechanism and interfaces for the cloud customers to inspect whether their VM instances are deployed on the same physical machine or not. This mechanism relies on the corresponding physical machines provided by the cloud IaaS to be provided with TEE implementation, including underlying secure hardware on which the TEE relies. Examples of such hardware include Intel® Software Guard Extensions (SGX), ARM TrustZone, and Trusted Platform Module (TPM), which can be integrated into the physical machine.

FIG. 1 illustrates a system architecture 100 of a cloud IaaS infrastructure according to an embodiment of the invention. The system architecture 100 is shown to include two physical machines 101 and 103 as an example, but it is understood that the cloud IaaS infrastructure can include more than two physical machines. Taking physical machine 101 as an example, the host operating system 102 is isolated from the TEE environment 104, where trusted application can be executed securely. When a new VM instance is deployed in the cloud, two applications are also deployed along with the VM. In an example, when $VM_A$ is deployed on physical machine 101, two applications (Inspect App 106 and Inspect $App_0$ 108) are also deployed. Inspect App 106 is an untrusted application deployed in $VM_A$ while Inspect $App_0$ 108 is a trusted TEE application. Inspect App 106 is instantiated in $VM_A$ to handle requests from a cloud customer. Inspect $App_0$ 108 interfaces with the untrusted application (Inspect App 106) and has access to the secure hardware 110. The secure hardware 110 includes platform specific key identified in FIG. 1 as K1. The cloud customer interfaces with the cloud IaaS infrastructure using a computing device (not shown) with one or more processors and non-transitory computer readable media. Examples of computing devices include laptop computers, desktop computers, smart phones, tablets, etc.

The untrusted application, e.g., Inspect App 106, handles two requests from the cloud customer: COLLECT and INSPECT requests. These are shown as examples in FIG. 1 as requests to physical machine 101 and physical machine 103, respectively. The COLLECT request returns evidence generated by the TEE application. Pieces of evidence obtained from all existing VMs can be collected and later used as input of the INSPECT request to a newly deployed VM. This is process is depicted in the example of FIG. 1 where the cloud customer sends a COLLECT request to $VM_A$ which provides $Evidence_A$, and $Evidence_A$ is used by the cloud customer in an INSPECT request to $VM_B$ which ultimately provides a report. Upon an INSPECT request, the TEE Inspect $App_0$ will verify the pieces of evidence and generate a report that states whether the new VM co-locates with any of the existing VMs. In the example of FIG. 1, evidence collection is performed on $VM_A$ and an inspection process is performed on VMB to determine whether VMA and VMB are co-located. The inspection process for the new VM does not necessarily involve interaction with already deployed VMs. In some embodiments, instead of verifying whether a new VM co-locates with any existing VMs, pieces of evidence from existing VMs are compared by a chosen VM to determine whether the chosen VM co-locates with any other existing VM.

In some instances, calls from the untrusted Inspect App to the trusted Inspect $App_0$ or from the trusted Inspect $App_0$ to the hardware can be redirected by the host operating system to another machine. Embodiments of the invention can detect this form of attack via timing measurements, as latency of a redirected or a relayed call should be much higher than latency of a system call. Since trusted computing components can provide trusted timestamps, the Inspect $App_0$ 108 can include a signed timestamp in the outputs of both COLLECT and INSPECT calls. In an embodiment, the Inspect App0 108 can throw exceptions when it detects an unexpectedly long response time from the secure hardware 110. Thus, a higher than expected latency can indicate that two VMs are not running on the same host machine.

In an embodiment, the role of a cloud customer can be replaced with a proxy that executes protocols on behalf of the cloud customer. The proxy service can be provided by the cloud provider to the customer. While only the cloud customer manages all the provisioned secrets, the source code of the proxy can be examined openly to ensure the correct execution of protocols. Protocols may include VM deployment, COLLECT requests, and INSPECT requests.

VM deployment: When the cloud customer deploys a new VM $VM_i$ to the cloud, untrusted application A and TEE application $A_0$ are also installed on $VM_i$ and in the TEE of the corresponding platform, respectively. Platform and physical machine will be used interchangeably, thus physical machine 101 and physical machine 103 are two separate platforms even if the TEE implementations are running on similar secure hardware (e.g., ARM TrustZone). Untrusted application A interacts with the cloud customer and forwards messages to TEE application $A_0$. In an embodiment where the TEE implementation is based on Intel® SGX technology, the TEE application $A_0$ is a signed enclave.

The cloud customer can then initiate a remote attestation procedure with the deployed TEE application $A_0$ following the standard/recommended remote attestation protocol. Remote attestation is performed for each VM deployment. Standard/recommended remote attestation protocol differs based on the secure hardware. If the attestation result is validated, a credential $S_i$ is provisioned from the cloud customer to TEE application $A_O$ through a secure channel established during the remote attestation process. FIG. 1 provides an example where credential SA is provisioned from the cloud customer to the secure hardware 110. The provisioned credential $S_i$ can be a signing key pair or a shared secret between the cloud customer and the TEE application $A_O$.

COLLECT: TEE application $A_O$ calls special instructions provided by the underlying secure hardware $P_i$ and generates an evidence $E_i$ based on an evidence generation function $G_e$. Special instructions called can be secure hardware dependent. For example, on Intel® SGX, the instruction EREPORT constructs a hardware based assertion report describing the enclave's identity which includes the enclave measurement and enclave attribute used in local attestation. The attestation report can serve as evidence. In another example, the instruction EGETKEY returns the persistent (i.e., unchanging) sealing key which can be platform-specific. The sealed shared secret can serve as evidence. Evidence $E_i$ is computed based on the platform-specific secret secured and provided by the secure hardware $P_i$. Therefore $E_i$ is only verifiable by other Inspect applications on the same platform. The evidence should also include authenticity and integrity checks from TEE application $A_O$ in order to guarantee that it has not been tampered with while being transmitted to the cloud customer. If the VM $VM_i$ is migrated to a different hardware, the evidence $E_i$ needs to be re-collected.

In an embodiment where a physical machine or platform includes multiple secure processors, the physical machine will have only one host operating system and only one TEE environment active. As such, the TEE will only interface with one secure processor of the multiple secure processors on the physical machine. That way, only one secure hardware on a platform or physical machine is responsible for responding to calls by the TEE application $A_O$.

INSPECT: The evidence $\{E_1, \ldots, E_{j-1}\}$ of all deployed VMs $\{VM_1, \ldots, VM_{j-1}\}$ are supplied by the cloud customer as input of the INSPECT request to the inspect application $A_O$ of a new VM $VM_j$. $A_O$ calls the special instructions provided by the underlying secure hardware $P_j$ to verify each of the supplied evidence $E_k$ (k=1, \ldots, j-1) according to the evidence verification function $V_e$. Verification is carried out based on the platform-specific secret secured and provided by $P_j$.

A report is generated by $A_O$ with the corresponding signature (e.g., using private key provisioned in $S_j$). The report returns either NULL, suggesting that the current VM does not co-locate with any of the existing VMs that belong to the same cloud customer; or a list $\{k\}$ if an existing VM $VM_k$ is deployed on the same platform as the current VM $VM_j$.

Regarding the evidence generation function $G_e$ and verification function, here are provided two examples that can be implemented via Intel SGX. The first example leverages local attestation service provided by Intel SGX, while the second example is based on data sealing/unsealing functionalities that can be used on different TEE implementations.

In an embodiment of the invention, evidence generation and verification based on SGX local attestation has two prerequisites. The first is that the cloud customer keeps a measurement value MRENCLAVE of the enclave $A_O$. The second is that for each $A_O$ instantiated for $VM_i$, the cloud customer has already provisioned a private signing key $SK_i$ during a remote attestation process. In some embodiments, TEE implementations on different secure hardware support different behavior. For example, some secure hardware support a separate TEE application $A_O$ instantiated for each VM whenever a VM is deployed, some secure hardware support a single TEE application $A_O$ that is shared among VMs on a physical machine, and some secure hardware support more than one TEE application $A_O$ instantiated for a single VM.

In an embodiment, evidence generation based on SGX local attestation involves: on each existing VM $VM_i$, the cloud customer sends MRENCLAVE along with the COLLECT request to its TEE application $A_O$. MRENCLAVE is an "enclave identity" which can be a measurement value represented as a 256-bit value. $A_O$ calls function sgx_create_report with MRENCLAVE as the target enclave information and returns the SGX report $E_i$ as the evidence. Since an SGX report comes along with a message authentication code (MAC) computed based on a platform-specific key, the SGX reports generated by the same SGX platform can be mutually verified. Preferably, $E_i$ is signed by $A_O$ using the private signing key $SK_i$ to prevent the untrusted application from compromising the integrity and authenticity of the SGX report. Other methods of anti-tampering measures can be utilized as well.

In an embodiment, evidence verification based on SGX local attestation involves: on the newly deployed VM $VM_j$, the cloud customer sends the collection of all pieces of evidence $\{E_1, \ldots, E_{j-1}\}$ along with the INSPECT request to the TEE application $A_O$ of the newly deployed VM $VM_j$. The TEE application $A_O$ calls function sgx_verify_report given each SGX report $E_k$, k=1, \ldots, j-1. If function sgx_verify_report returns SGX_SUCCESS on an SGX report $E_k$, then $VM_k$ and $VM_j$ are hosted on the same platform, thus $A_O$ returns report $\{false, k, Sig_{SK_j}\}$ suggesting the current VM co-locates with an existing VM $VM_k$. If sgx_verify_report fails with SGX_ERROR_MAC_MISMATCH error for all collected pieces of evidence, $A_O$ returns report $\{true, Sig_{SK_j}\}$. The report returned in both cases are signed with a corresponding private signing key $SK_j$ for $A_O$.

In an embodiment of the invention, evidence generation and verification based on data sealing/unsealing functionalities has the following prerequisite: for each $A_O$ deployed on $VM_i$, the cloud customer has provisioned a private signing key $SK_i$ and a shared secret S which is the same for all $A_O$.

In an embodiment, evidence generation based on data sealing/unsealing functionalities involves: on each existing VM $VM_i$, $A_O$ seals the shared secret S as $E_i$ by calling function sgx_seal_data and returns the sealed information to the cloud customer. Since the sealing key is platform-specific, sealed data on the same SGX platform can be unsealed by any other enclave as long as either the enclave measurement is the same, or the author of the enclaves are the same (depending on the sealing policy). In an embodiment, each enclave $A_O$ is signed by its author, whose public key is hashed and saved on the platform after the enclave is initialized. As such, information about an author is embedded in each enclave $A_O$ and is not provided by an outside entity. The hashed public key can then be used as a policy to determine to unseal some data. For example, if two enclaves have the same author, then according to an unsealing policy, the hashed public key of the author can be used to determine whether or not to unseal data from either enclave. This provides a security level, preventing enclaves not belonging to a certain author from being probed. Preferably, $E_i$ is signed by $A_O$ using private signing key $SK_i$ to prevent the untrusted application from compromising the integrity and authenticity of the sealed data.

In an embodiment, evidence verification based on data sealing/unsealing functionalities involves: on the newly deployed VM $VM_j$, the cloud customer sends the collection of all evidences $\{E_1, \ldots, E_{j-1}\}$ along with the INSPECT request to the TEE application $A_0$ of the newly deployed VM $VM_j$. The TEE application $A_0$ calls function sgx_unseal_data on each sealed data $E_k$, where k=1, j−1, and obtains the unsealed data $\{S'_1, \ldots, S'_{j-1}\}$. $A_0$ then compares each unsealed data with the provisioned shared secret S. If there exists any unsealed data $S'_k$ that equals S, then the secret is unsealed successfully, suggesting that $VM_j$ co-locates on the same physical machine as $VM_k$; thus $A_0$ returns report $\{false, k, Sig_{SK_j}\}$; otherwise $A_0$ returns $\{true, Sig_{SK_j}\}$.

Referring back to FIG. 1, the secure hardware keys identified as K1 and K2 are the platform-specific keys protected by the secure hardware. K1 and K2 can be sealing keys if sealing is used for generating evidence, or K1 and K2 can be the report key if local attestation is used for evidence generation.

Figure 2:
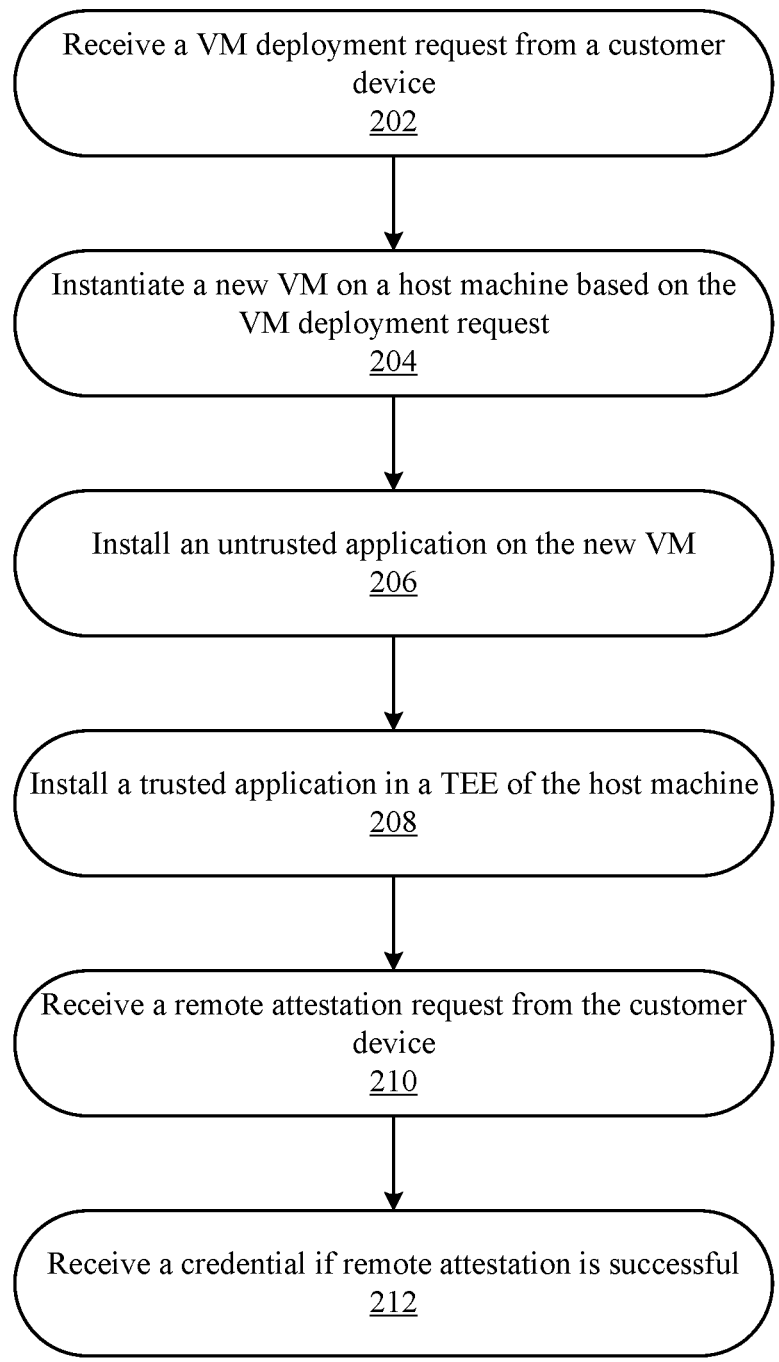
FIG. 2 illustrates steps of a method for deploying a VM in a cloud IaaS infrastructure according to an embodiment of the invention.

FIG. 2 is a flowchart for deploying a VM in a cloud IaaS infrastructure according to an embodiment of the invention. At 202, a VM deployment request is received at the cloud infrastructure from a customer device (also referred to herein as user device). The customer device is a computing device with one or more processors and non-transitory computer readable media. The customer device can be a laptop, smartphone, desktop computer, and so on. The VM deployment request indicates that a cloud customer would like to run a certain VM on the cloud IaaS.

At 204, the cloud infrastructure instantiates a new VM on a host machine based on the VM deployment request. At 206, the cloud infrastructure or the customer device installs an untrusted application on the newly instantiated VM, and at 208, the cloud infrastructure or the customer device installs a trusted application in a TEE of the host machine.

At 210, the trusted application in TEE receives a remote attestation request from the customer device with the assistance of the untrusted application. The trusted application first establishes a secure communication channel with the customer device, with the help of some secure key-exchange protocols such as Diffie-Hellman key-exchange. Then the trusted application sends its measurement report generated and signed by the TEE to the customer device. The customer device can then verify the integrity of the trusted application and determine whether the trusted application is deployed on a valid TEE-enabled platform.

At 212, the trusted application receives a credential from the customer device if remote attestation is successful. The credential may include some shared secrets between the customer device and the trusted application. The credential may also include a unique signing key pair.

Figure 3:
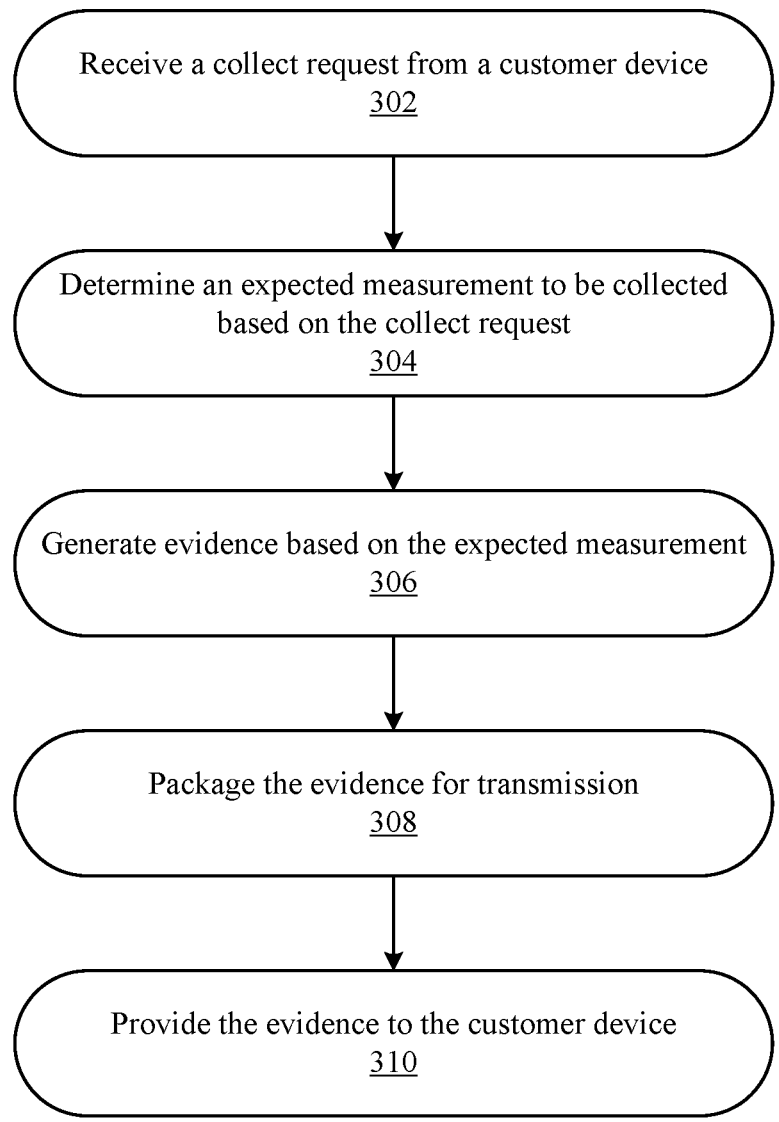
FIG. 3 illustrates steps of a protocol for collecting evidence according to an embodiment of the invention.

FIG. 3 is a flowchart for a COLLECT protocol according to an embodiment of the invention. At 302, a deployed VM receives a collect request from a customer device. The collect request can include the expected measurement of the trusted application. In an embodiment, the expected measurement is an enclave measurement, e.g., MRENCLAVE value. In another embodiment, the expected measurement is a shared secret. At 304, the cloud infrastructure determines the expected measurement to be collected based on the collect request.

At 306, the cloud infrastructure generates evidence based on the expected measurement. Trusted applications of hosts running VMs for an authenticated user of the customer device generate evidence based on the expected measurement provided in the collect request. The trusted applications use underlying secure hardware of the hosts to generate the evidence.

In some embodiments, at 308, the evidence is packaged by the trusted applications for transmission to the customer device. Packaging the evidence includes signing, by the trusted applications, the evidence with corresponding private signing keys. At 310, the cloud infrastructure provides the evidence generated by each host for each VM of the authenticated user to the customer device.

Figure 4:
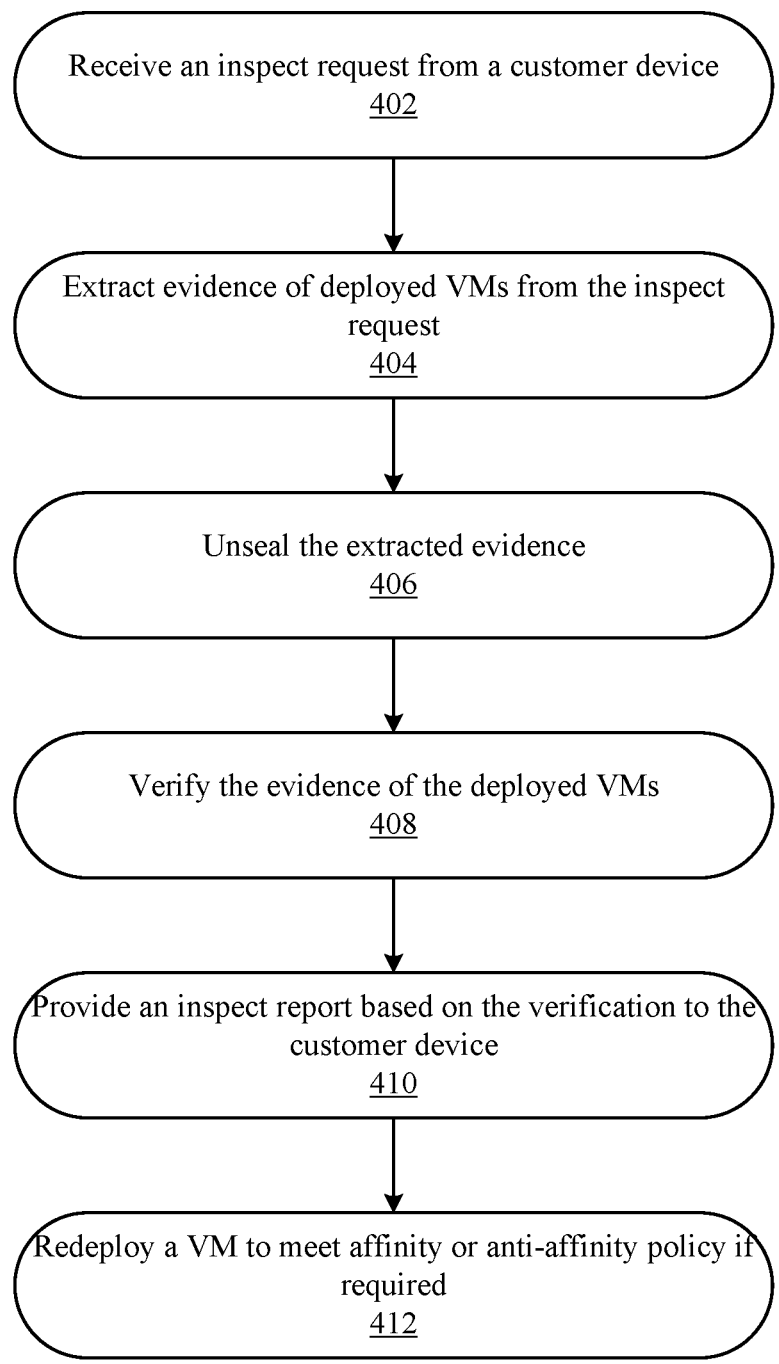
FIG. 4 illustrates steps of a protocol for inspecting the collected evidence according to an embodiment of the invention.

FIG. 4 is a flowchart for an INSPECT protocol according to an embodiment of the invention. At 402, the trusted application of a newly deployed VM receives an inspect request from a customer device. The inspect request includes evidence of one or more previously deployed VMs in the cloud infrastructure. At 404, the trusted application extracts evidence of deployed VMs embedded in the inspect request. In some embodiments, at 406, the trusted application unseals each piece of evidence in the evidence using a platform-specific sealing key. In some embodiments, at 406, the trusted application verifies that a hashed public key of an author matches public keys of enclaves where each piece of evidence was collected. For each public key that matches the hashed public key, the trusted application determines to try and unseal the evidence.

At 408, the trusted application of the newly deployed VM verifies the evidence of all previously deployed VMs based on the inspect request. The trusted application tests whether the newly deployed VM is co-located with a previously deployed VM by comparing the collected evidence of the previously deployed VMs with probed evidence of the newly deployed VM. Probed evidence can be a shared secret stored by the trusted application or a measurement performed by the trusted application.

At 410, the trusted application provides an inspect report to the customer device. The inspect report is a signed report including which VMs are hosted on the same physical machine if there are matches resulting in the verification of 410. The inspect report is a signed report indicating that the VM is not co-located with other VMs if there are no matches resulting in the verification of 410. If the report indicates that a policy of the VMs are not satisfied, VMs can then be moved to be co-located or not to meet the policy at 412.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for detecting co-located virtual machines (VMs), the method comprising:
   receiving one or more VM deployment requests from a user device;
   deploying one or more VMs in a cloud infrastructure based on the VM deployment requests, the cloud infrastructure comprising one or more host machines each having a trusted execution environment (TEE);
   collecting evidence for each of the one or more VMs using a trusted application running in the respective TEE of the respective host machine;
   inspecting the collected evidence to determine that at least two VMs in the one or more VMs share different host machines in the one or more host machines; and
   requesting at least one VM of the at least two VMs be redeployed to meet an affinity policy based on results of inspecting the collected evidence such that the at least two VMs share a same host machine.

2. The method according to claim 1, wherein each of the TEE is based on Software Guard Extensions (SGX), ARM TrustZone, or Trusted Platform Module.

3. The method according to claim 1, wherein deploying the one or more VMs in the cloud infrastructure comprises:
   instantiating the one or more VMs on the one or more host machines;
   installing an untrusted application on each of the one or more VMs; and for each untrusted application installation, installing the trusted application on the respective TEE of the respective host machine.

4. The method according to claim 3, wherein the installed untrusted application interfaces with the corresponding trusted application on the respective host machine for access to a secure hardware of the respective host machine.

5. The method according to claim 3, wherein the installed untrusted application handles the requests from the user device.

6. The method according to claim 3, further comprising:
   for each VM deployed, performing a remote attestation procedure to obtain credentials from the user device.

7. The method according to claim 6, wherein the credentials include one or more of a signing key pair or a shared secret.

8. The method according to claim 1, wherein collecting the evidence for each of the one or more VMs comprises:
   receiving a collect request from the user device;
   generating, by the trusted application on the respective host machine, the evidence for each of the one or more VMs based on the collect request by interacting with a secure hardware to use its platform-specific credentials; and
   providing the evidence to the user device via a corresponding untrusted application.

9. The method according to claim 8, wherein evidence generation is based on at least one of local attestation or data sealing and unsealing.

10. The method according to claim 1, wherein inspecting the collected evidence comprises:
    receiving an inspect request from the user device, the inspect request comprising the collected evidence;
    verifying, by the trusted application on a corresponding host machine, the collected evidence based on the inspect request by interacting with a secure hardware to use its platform-specific credentials; and
    providing, to the user device, an inspect report based on the verification of the collected evidence.

11. The method according to claim 10, wherein the inspect report comprises:
    nothing or NULL based on the at least two VMs sharing the different host machines.

12. A system for detecting co-located virtual machines (VMs), the system comprising one or more processors, which alone or together, are configured to provide for execution of the following steps:
    receiving one or more VM deployment requests from a user device;
    deploying one or more VMs in a cloud infrastructure based on the VM deployment requests, the cloud infrastructure comprising one or more host machines each having a trusted execution environment (TEE);
    collecting evidence for each of the one or more VMs using a trusted application running in a corresponding TEE of a corresponding host machine;
    inspecting the collected evidence to determine that at least two VMs in the one or more VMs share different host machines in the one or more host machines; and
    requesting at least one VM of the at least two VMs be redeployed to meet an affinity policy based on results of inspecting the collected evidence such that the at least two VMs share a same host machine.

13. The system according to claim 12, wherein deploying the one or more VMs in the cloud infrastructure comprises:
    instantiating the one or more VMs on the one or more host machines;
    installing an untrusted application on each of the one or more VMs; and for each untrusted application installation, installing the trusted application on the respective TEE of the respective host machine.

14. The system according to claim 13, wherein the installed untrusted application interfaces with the corresponding trusted application on the respective host machine for access to a secure hardware of the respective host machine.

15. The system according to claim 13, wherein the installed untrusted application handles the requests from the user device.

16. A method for detecting co-located virtual machines (VMs), the method comprising:
    receiving one or more VM deployment requests from a user device;
    deploying one or more VMs in a cloud infrastructure based on the VM deployment requests, the cloud infrastructure comprising one or more host machines each having a trusted execution environment (TEE);
    collecting evidence for each of the one or more VMs using a trusted application running in the respective TEE of the respective host machine;
    inspecting the collected evidence to determine that at least two VMs in the one or more VMs share a same host machine in the one or more host machines; and
    requesting at least one VM of the at least two VMs be redeployed to meet an anti-affinity policy based on results of inspecting the collected evidence such that the at least two VMs share different host machines within the cloud infrastructure.

17. The method according to claim 16, wherein each of the TEE is based on Software Guard Extensions (SGX), ARM TrustZone, or Trusted Platform Module.

18. The method according to claim 16, wherein deploying the one or more VMs in the cloud infrastructure comprises:
   instantiating the one or more VMs on the one or more host machines;
   installing an untrusted application on each of the one or more VMs; and for each untrusted application installation, installing the trusted application on the respective TEE of the respective host machine.

19. The method according to claim 16, wherein inspecting the collected evidence comprises:
   receiving an inspect request from the user device, the inspect request comprising the collected evidence;
   verifying, by the trusted application on a corresponding host machine, the collected evidence based on the inspect request by interacting with a secure hardware to use its platform-specific credentials; and
   providing, to the user device, an inspect report based on the verification of the collected evidence.

20. The method according to claim 19, wherein the inspect report comprises:
   a list of VMs from the at least two VMs that share the same host machine.

\* \* \* \* \*